United States Patent Office 2,979,420
Patented Apr. 11, 1961

2,979,420

SILICONE PRIMERS FOR ROOM TEMPERATURE VULCANIZING SILICONE RUBBER

Jack R. Harper, Midland, Mich., assignor to Dow Corning Corporation, Midland, Mich., a corporation of Michigan No Drawing. Filed Sept. 15, 1958, Ser. No. 760,841

1 Claim. (Cl. 117—72)

This invention relates to the use of monohydrocarbon triacyloxysilanes and partial hydrolyzates thereof as primers for surfaces to which room temperature vulcanizing silicone rubbers are to be attached.

Since the formulation of the first room temperature vulcanizing silicone rubbers there has developed the problem of finding a means of bonding such rubbers to materials such as metals, glass, masonry and the like. Silanes which have been previously used for priming such surfaces have proved unsatisfactory. For instance, chlorosilanes as primers are detrimental in that the hydrochloric acid evolved with hydrolysis of the silane attacks the subsequently applied rubber stock. On the other hand, hydrocarbonoxy silanes [i.e. $R_nSi(OR')_{4-n}$] have been found to be inoperative as a primer for this purpose. The object of this invention then is to provide a suitable surface primer which will give satisfactory bonding of room temperature silicone rubber stocks to treated surfaces.

The method of this invention comprises (1) applying to a surface a liquid comprising a composition selected from the group consisting of a silane of the formula $RSi(OZ)_3$ in which each R is selected from the group consisting of the phenyl radical and aliphatic hydrocarbon radicals of less than 4 carbon atoms and each Z is an acyl radical of less than 4 carbon atoms and partial hydrolyzates of such silanes, (2) allowing the coating to dry and (3) applying to said primed surface a room temperature vulcanizable silicone compound.

In the primer employed in this invention R can be such radicals as, for example, phenyl, methyl, ethyl, propyl and vinyl radicals and Z can be the formyl radical, the acetyl radical or the propionyl radical. More specifically, examples of the silanes which are included in this invention are such materials as $CH_3Si(OOCCH_3)_3$     $CH_3Si(OOCH)_3$
$C_2H_3Si(OOCCH_3)_3$     $CH_3Si(OOCC_2H_5)_3$
$C_2H_5Si(OOCCH_3)_3$     $C_2H_5Si(OOCH)_3$
$C_6H_5Si(OOCCH_3)_3$     $C_2H_3Si(OOCH)_3$
$C_3H_7Si(OOCCH_3)_3$     $CH_3Si(OOCH)(OOCCH_3)_2$
$C_3H_7Si(OOCH)_3$ and mixtures thereof. More than one kind of acyloxy radical can be attached to any silicon.

Also operative are the partial hydrolyzates of such silanes. These partial hydrolyzates are formed by the hydrolysis of some of the acyl radicals by water vapor in the air and reaction of the resulting SiOH with a silicon-bonded acyloxy radical to split out a carboxylic acid and form an SiOSi linkage. The simplest of these partial hydrolyzates are disiloxanes such as

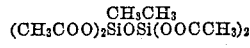
$(CH_3COO)_2SiOSi(OOCCH_3)_2$ and trisiloxanes such as

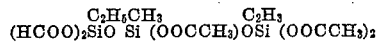
$(HCOO)_2SiO\ Si\ (OOCCH_3)OSi\ (OOCCH_3)_2$

These partial hydrolyzates can include any combination of groups depending on the silanes present in the original mixture and can include more complicated structures containing silicon atoms in which all three acyl radicals have been split off to form branched chain siloxanes. However, these partial hydrolyzates remain operative in that they still contain the reactive acyloxy radicals attached to silicon.

The primer can be applied to metals such as steel, aluminum and brass; to all sorts of masonry surfaces; to glass and to ceramic surfaces. The primer can be applied by brushing, spraying or dipping, by itself or in solution. It is preferable, however, that it be applied as a solvent solution containing not more than 15% by weight of the silane primer.

The drying rate of the primer coating is primarily dependent on two factors. One factor is the rate of condensation of the silanes or partial hydrolyzates thereof which is dependent, first, on the size of the R and Z radicals and, second, on the amount of water present for hydrolysis of the Z radicals to volatile acids. Where R and Z are larger than the claimed limits, the rate of hydrolysis and condensation of the silanes is reduced to the point where the primer coating does not dry satisfactorily. Where the silane is exposed to water as, for example, in the form of steam, hydrolysis and condensation is accelerated.

The other factor is the presence or absence of solvent. If a solvent is employed, the volatility of the solvent affects the drying rate of the primer coating. It is desirable that any solvent employed be sufficiently volatile to evaporate under coating conditions at least as rapidly as the silane can hydrolyze and condense.

Due to the possible variations in the two factors above it is impossible to set numerical limits for coating drying time which can be made to vary from a few seconds to hours.

The silicone rubbers which can be adhered to primed metal by the method of this invention can be any room temperature vulcanizable silicone elastomers. This includes the following systems:

The combination of an acid-free diorganopolysiloxane, a silicate and a metal salt of a carboxylic acid such as those shown in copending application Serial No. 632,-630, filed January 7, 1957, by Keith E. Polmanteer, Patent No. 2,927,907.

The combination of a diorganopolysiloxane containing silicon-bonded hydroxyl groups, Cellosolve silicates and metal salts of carboxylic acids as shown in copending application Serial No. 691,176, filed October 21, 1957, by Alan D. Chipman, Patent No. 2,902,467.

The diacyloxy endblocked diorganopolysiloxanes disclosed in copending application Serial No. 723,110, filed March 24, 1958, by Leonard B. Bruner, Jr., now abandoned.

The combination of from .01 to 5% by weight of an organohydrogenpolysiloxane, a diorganopolysiloxane containing at least two SiOH groups per molecule and a metal salt of a carboxylic acid as disclosed in copending application Serial No 554,636, filed December 22, 1955, by Robert R. Selfridge.

The foam-producing combination of a diorganopolysiloxane containing both silicon-bonded hydroxyl groups and silicon-bonded hydrogen atoms and a stannous salt of a carboxylic acid with or without additional hydroxylated compounds as disclosed in copending application Serial No. 708,369, filed January 13, 1958, by Leonard B. Bruner, Jr., now abandoned.

The combination of an acid-free diorganopolysiloxane, an alkylpolysilicate, and a condensation product of an aldehyde and an amine as disclosed in U.S. Patent 2,833,742.

Room temperature vulcanizing stocks employing the reaction of a silicon-bonded hydrogen and a silicon-bonded alkenyl radical in the presence of a platinum catalyst are also operative in the method of this invention.

The following examples are merely illustrative and are not intended to limit this invention which is properly delineated in the claim.

Example 1

The primer solution employed in this example was a 10% by weight solution in methylene chloride of methyltriacetoxysilane. The room temperature vulcanizing silicone rubber stock consisted of (1) 100 parts by weight of a composition consisting of 100 parts of a hydroxyendblocked dimethylpolysiloxane fluid having a viscosity at 25° C. of 12,000 cs., 30 parts diatomaceous earth and 2 parts tetra-n-propylorthosilicate and (2) 4 parts of a composition consisting of 100 parts of a trimethylsiloxy endblocked dimethylpolysiloxane fluid having a viscosity at 25° C. of 12,500 cs., 25 parts diatomaceous earth, 0.5 part of iron oxide and 14 parts of dibutyltindilaurate.

The primer solution was applied to both aluminum and steel panels. The room temperature vulcanizing silicone rubber was poured onto the primed surface (I) immediately after priming, (II) 5 minutes after priming, (III) 15 minutes after priming, (IV) 1 hour after priming and (V) on unprimed panels. The rubber was allowed to set up after which the bond was tested by trying to peel the rubber from the metal surface with a spatula. The results were the same for both aluminum and steel panels. In tests I and II some adhesion was found, i.e. there was spotty tearing of the silicone rubber rather than breakdown of the primer. In tests III and IV the adhesion was good as shown by the fact that only cohesive failure in the cured room-temperature-vulcanizing rubber was found. In the control test V, the room temperature vulcanizing silicone rubber stock peeled cleanly off the metal with no effort.

Example 2

When the following acyloxysilanes are substituted for the methyltriacetoxysilane employed in Example 1, similar excellent bonding is obtained between the silicone elastomer and the metal surfaces:

$C_2H_5Si(OOCCH_3)_3$   $C_6H_5Si(OOCCH_3)_3$
$C_2H_3Si(OOCCH_3)_3$   $CH_3Si(OOCH)_3$
$C_3H_7Si(OOCCH_3)_3$   $C_2H_3Si(OOCH)_3$,
and $C_2H_5Si(OOCH)_2(OOCC_2H_5)$.

Example 3

When a steel surface, a brick surface, a glass surface, and a tile surface are each primed with a partial hydrolyzate of the formula

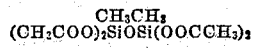

and the primer is allowed to dry, subsequently applied room temperature vulcanizing silicone elastomers such as that of Example 1 adhere strongly to each of the primed surfaces.

That which is claimed is:

The method which consists essentially of (1) applying to a surface a liquid coating comprising a composition selected from the group consisting of (a) silanes of the formula $RSi(OZ)_3$ in which each R is selected from the group consisting of the phenyl radical and aliphatic hydrocarbon radicals of less than 4 carbon atoms and each Z is an acyl radical of less than 4 carbon atoms and (b) partial hydrolyzates of such silanes, (2) allowing the coating to dry and (3) applying on said dried coating a silicone compound capable of curing at room temperature.

References Cited in the file of this patent

UNITED STATES PATENTS

| | | |
|---|---|---|
| 2,615,861 | Peyrot et al. | Oct. 28, 1952 |
| 2,623,832 | MacKenzie et al. | Dec. 30, 1952 |
| 2,634,285 | Rust et al. | Apr. 7, 1953 |
| 2,643,964 | Smith-Johannsen | June 30, 1953 |
| 2,843,555 | Berridge | July 15, 1958 |